United States Patent [19]
Wudl et al.

[11] Patent Number: 5,891,968
[45] Date of Patent: Apr. 6, 1999

[54] METHOD OF MAKING SELF-DOPED ZWITTERIONIC HETEROCYCLIC POLYMERS

[75] Inventors: Fred Wudl; Alan Heeger, both of Santa Barbara, Calif.

[73] Assignee: The Regents of University of California, Oakland, Calif.

[21] Appl. No.: 477,186

[22] Filed: Jun. 7, 1995

Related U.S. Application Data

[62] Division of Ser. No. 336,328, Nov. 8, 1994, which is a continuation of Ser. No. 16,658, Feb. 9, 1993, abandoned, which is a continuation of Ser. No. 607,851, Nov. 1, 1990, abandoned, which is a continuation of Ser. No. 156,928, Dec. 14, 1987, abandoned.

[30] Foreign Application Priority Data

Mar. 24, 1986 [JP] Japan ................................... 61-64272

[51] Int. Cl.⁶ ........................... C08G 75/00; C08G 73/00
[52] U.S. Cl. ........................ 525/417; 525/410; 528/377; 528/360
[58] Field of Search ................................... 525/417, 410; 528/377, 360

[56] References Cited

U.S. PATENT DOCUMENTS

| | | |
|---|---|---|
| 4,001,150 | 1/1977 | Juna et al. . |
| 4,487,667 | 12/1984 | Traynor . |
| 4,501,686 | 2/1985 | Hotta et al. . |
| 4,521,589 | 6/1985 | Yamamoto et al. . |
| 4,543,402 | 9/1985 | Traynor . |
| 4,547,270 | 10/1985 | Naarmann . |
| 4,548,738 | 10/1985 | Jenekhe .................................. 252/500 |
| 4,567,250 | 1/1986 | Naarmann et al. . |
| 4,568,483 | 2/1986 | Naarmann et al. . |
| 4,582,575 | 4/1986 | Warren et al. . |
| 4,607,083 | 8/1986 | Muenstedt et al. . |
| 4,640,748 | 2/1987 | Wudl et al. . |
| 4,929,389 | 5/1990 | Aldissi . |

FOREIGN PATENT DOCUMENTS

| | | |
|---|---|---|
| 86106375 | 3/1986 | European Pat. Off. . |
| 3325893 | 1/1985 | Germany . |
| 13425511 | 1/1986 | Germany . |
| 121168 | of 1981 | Japan . |
| 136469 | of 1981 | Japan . |
| 222151A | 6/1982 | Japan . |
| 202226A | 5/1983 | Japan . |
| 196566 | of 1984 | Japan . |
| 196573 | of 1984 | Japan . |
| 2033368 | of 1984 | Japan . |
| 203369 | of 1984 | Japan . |
| 3870 | of 1984 | Japan . |
| 3872 | of 1984 | Japan . |
| 3873 | of 1984 | Japan . |
| 229917A | 4/1984 | Japan . |

OTHER PUBLICATIONS

Y. Ikenoue et al., *Synth. Met.* 40:333–340 (1991).
Kobayashi, T., et al., "Polyaniline Film–Coated Electrodes as Electrochomic Display Devices", J. Electroanal. Chem. 161:419 (1984).
Nigrey, P.J., et al., "Electrochemistry of Polyacetylene, $(CH)_x$: Electrochemical Doping of $(CH)x$ Films to the Metallic State", J.C.S. Chem. Comm. pp. 594–595 (1979).
Nigrey, P.J., et al., "Lightweight Rechargeable Storage Batteries using Polyacetylene, $(CH)_x$ as the Cathode– Active Material", J. Electrochem. Soc. pp. 1651–1654 (1987).
Diaz, A.F., et al., "Electroactive Polyaniline Films", J. Electroanal. Chem. 111:111(1980).
Kaneto, K., et al., "Characteristics of Electro–Optic Device Using Conducting Polymers, Polythiophene and Polypyrrole Films", Japanese J. of Applied Physics 22(7):412 (1983).
Genies, E.M., "Spectroelectrochemical Study of Polypyrrole Films", J. Electroanal. Chem. 149:101 (1983).
Druy, M.A., et al., J. Physique 44:595 (1983).
A.O. Patil et al., *Synth Met.* 20:151 (1987).
Y. Ikenoue, *J. Am. Chem. Soc.* 110:2983 (1988).
Y. Ikenoue et al., *Synth. Met.* 30:305 (1989).
Druy et al., (1983) Journal de Physique 44:C3–595.
Kaneto et al., (1983) Japan Journal of Applied Physics 22(7):L412.
Wudl et al., (1984) J. Org. Chem. 49:3382–3384.
Thackeray et al., (1985) J. Phys. Chem. 89:5133–5140.
Patil et al., (1987) Synthetic Metals 20:151–159.
Diaz et al., (1980) J. Electro Chem. 111:111.
Diaz et al., (1983) J. Electro Chem. 149:101.
Yoneyama (1984) J. Electro Chem. 161:419.
Evaluation of Electrochromic Fast–Switching Behavior of Self–Doped Conducting Polymer, Synthetic Metals, 40 (1991), 333–340.

*Primary Examiner*—Christopher Henderson
*Attorney, Agent, or Firm*—Peters, Verny, Jones & Biksa, L.L.P.

[57] ABSTRACT

A self-doped conducting polymer having along its backbone a π-electron conjugated system which comprises a plurality of monomer units, between about 0.01 and 100 mole % of the units having covalently linked thereto at least one Bronsted acid group. The conductive zwitterionic polymer is also provided. as are monomers useful in the preparation of the polymer and electrodes comprising the polymer.

22 Claims, 5 Drawing Sheets

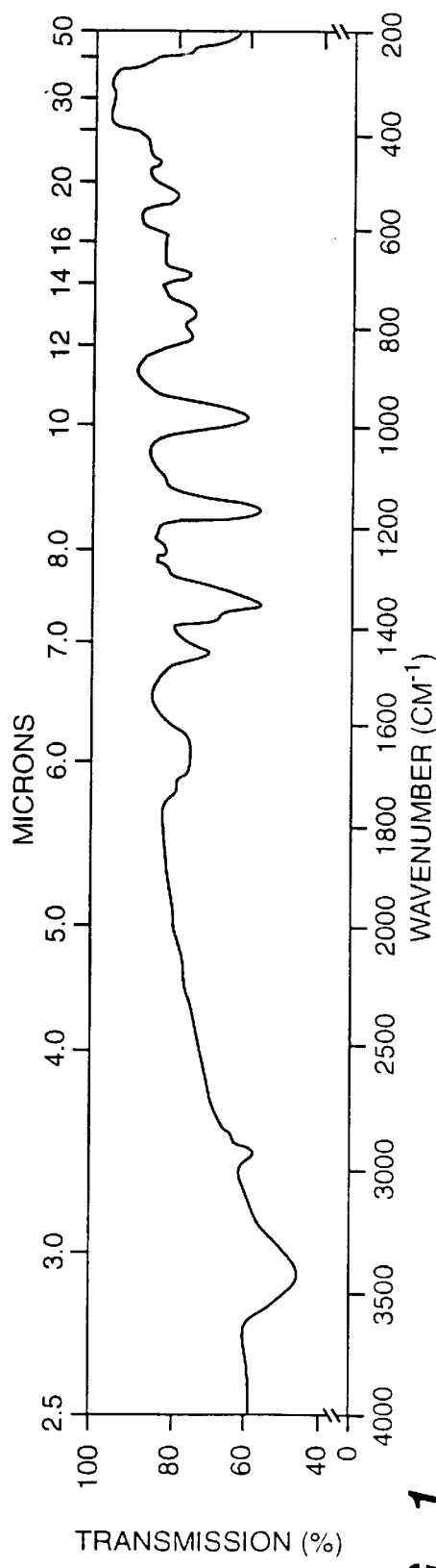
FIG._1
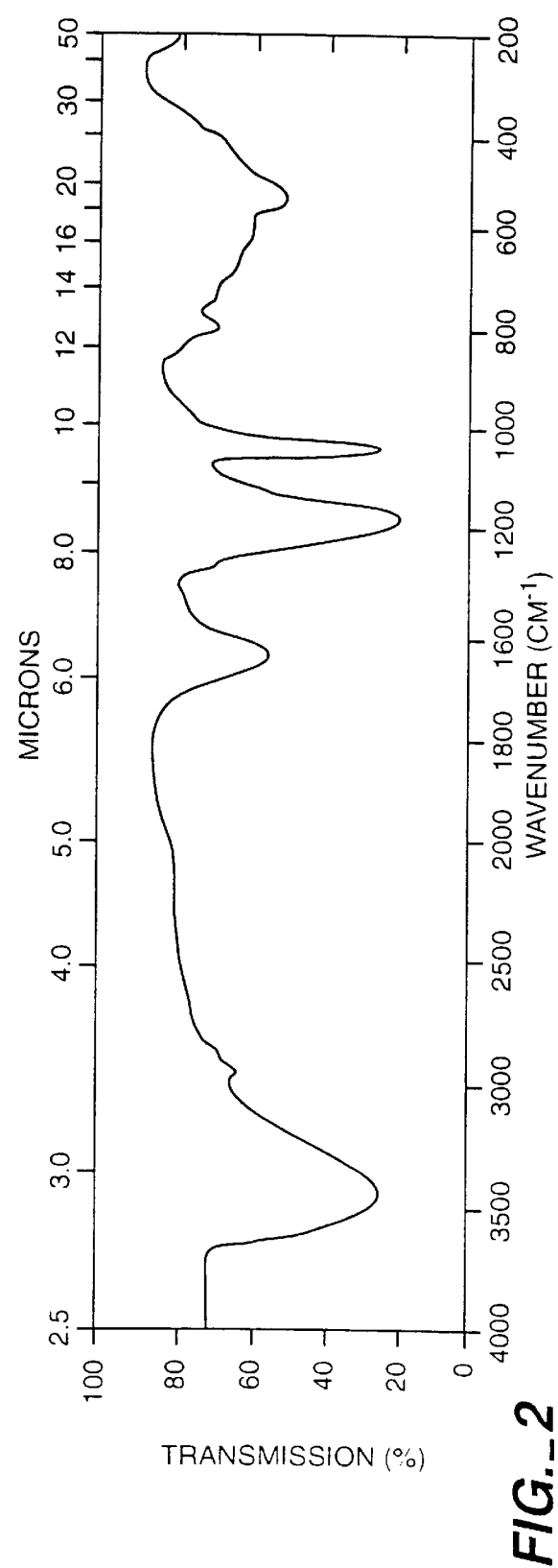
FIG._2

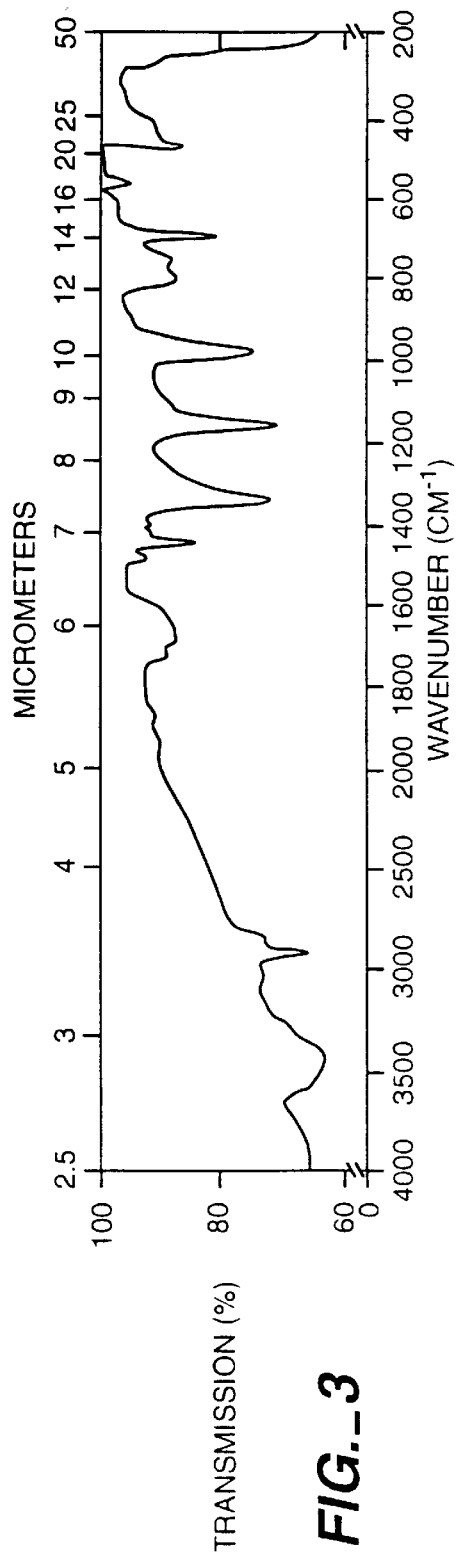
FIG._3
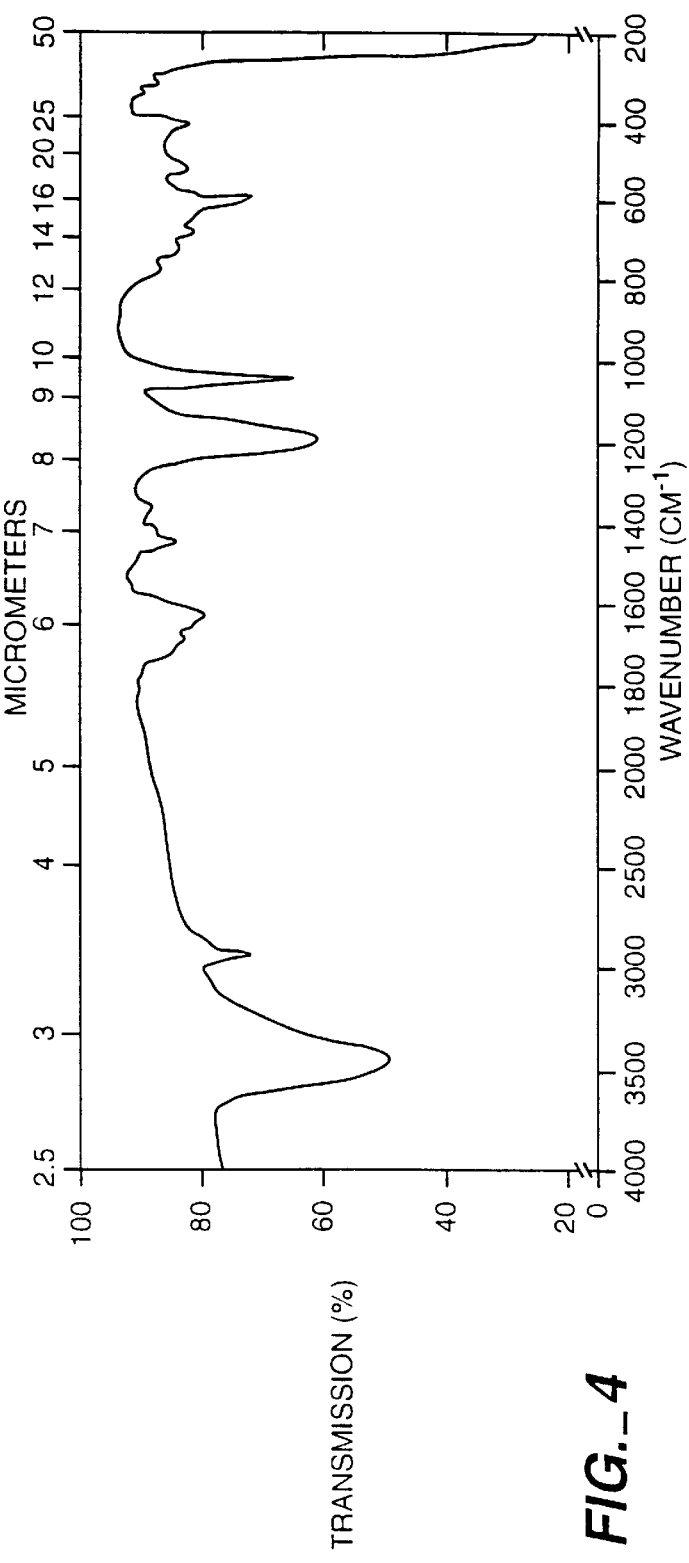
FIG._4

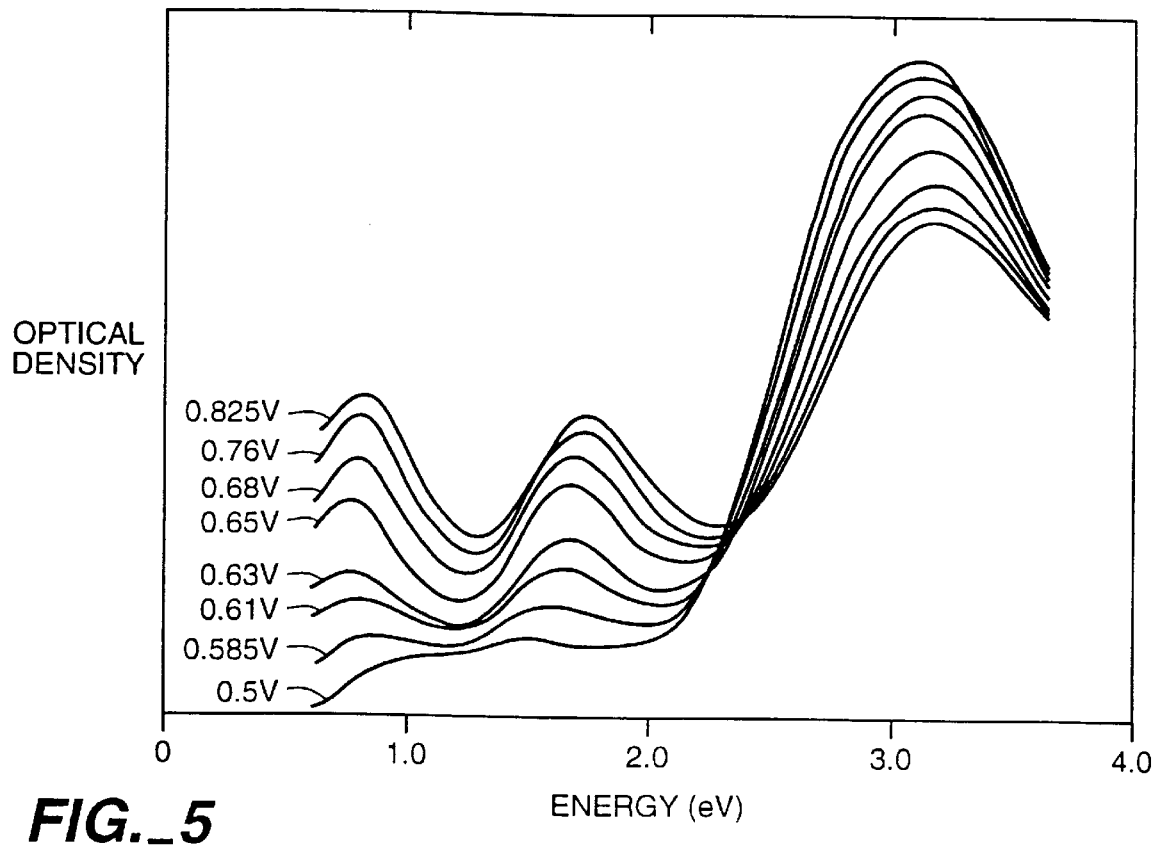
FIG._5
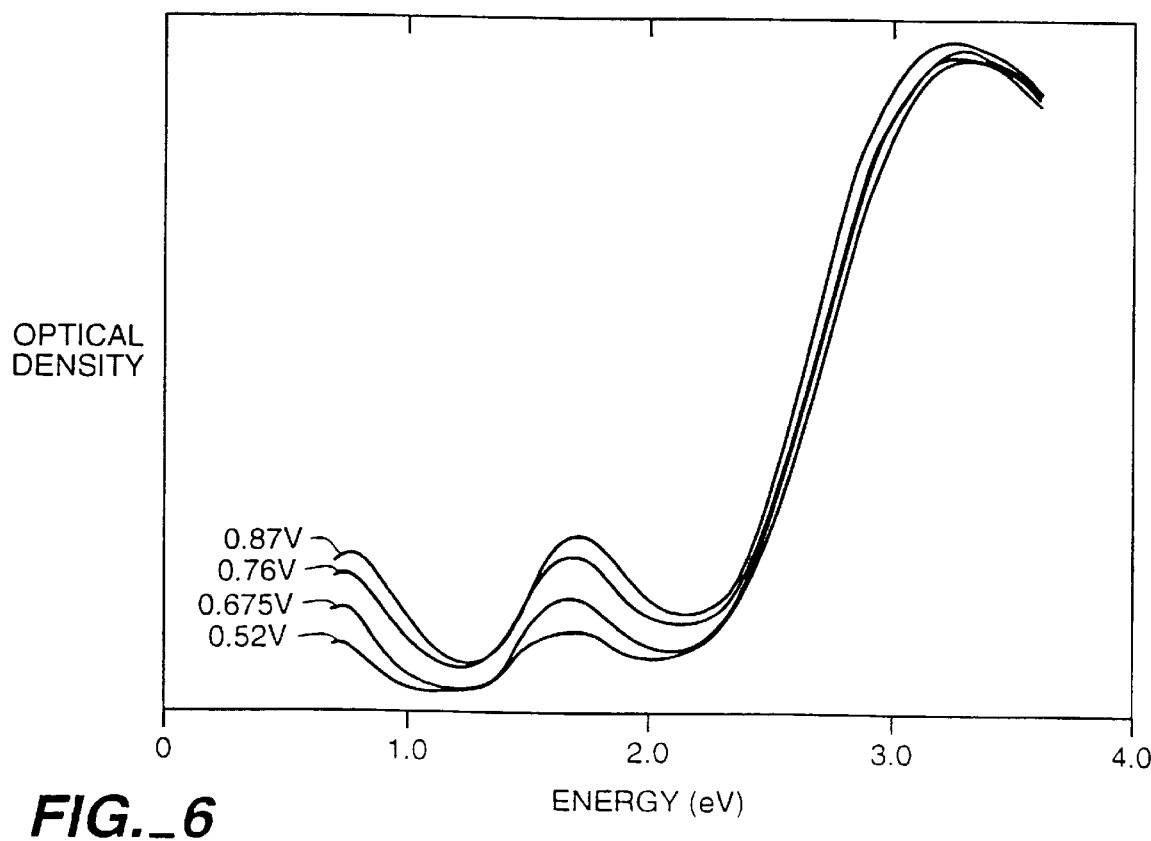
FIG._6

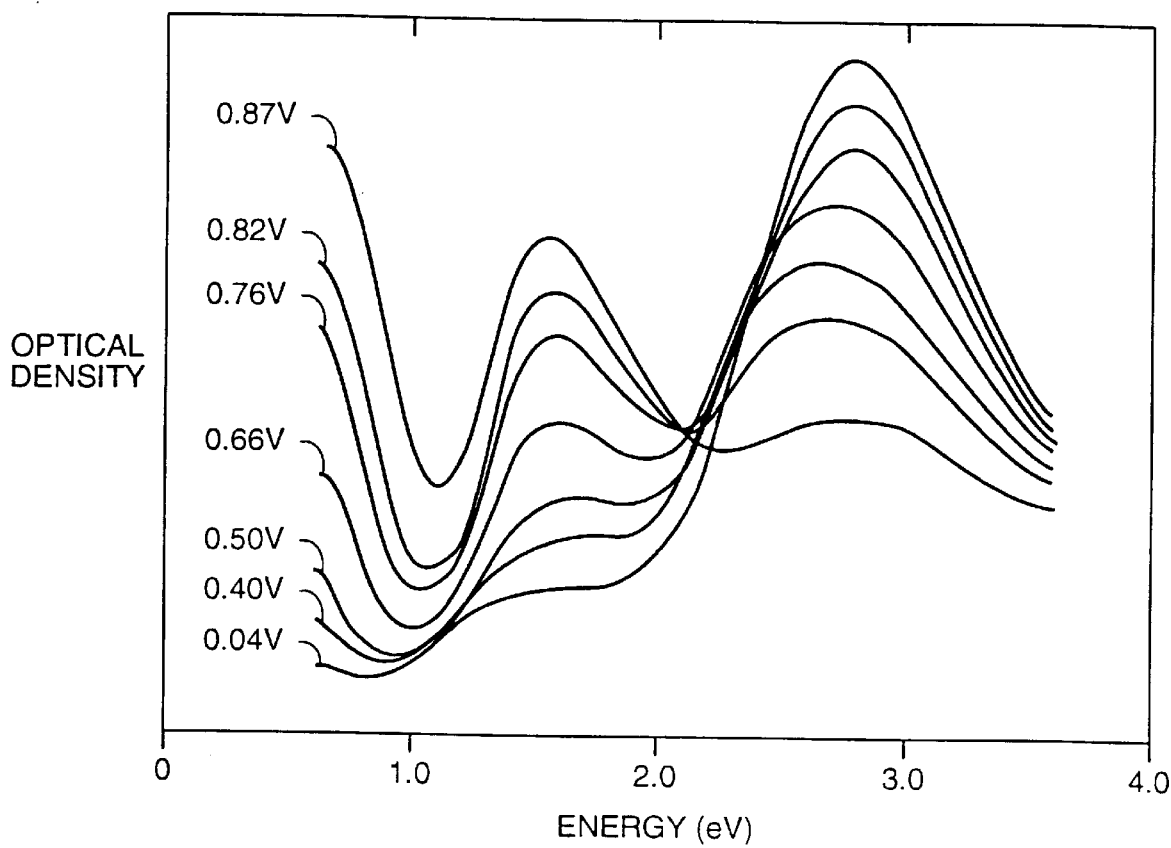
FIG._7
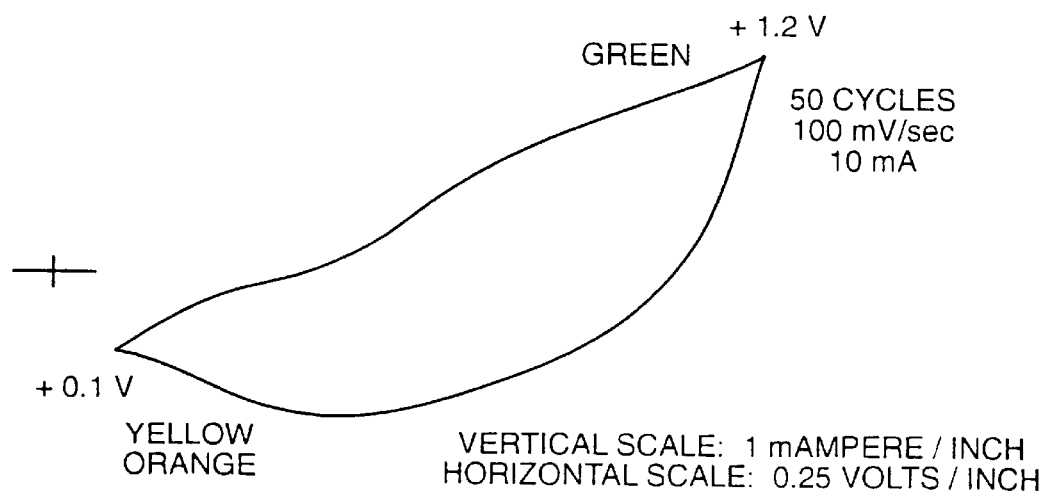
FIG._8

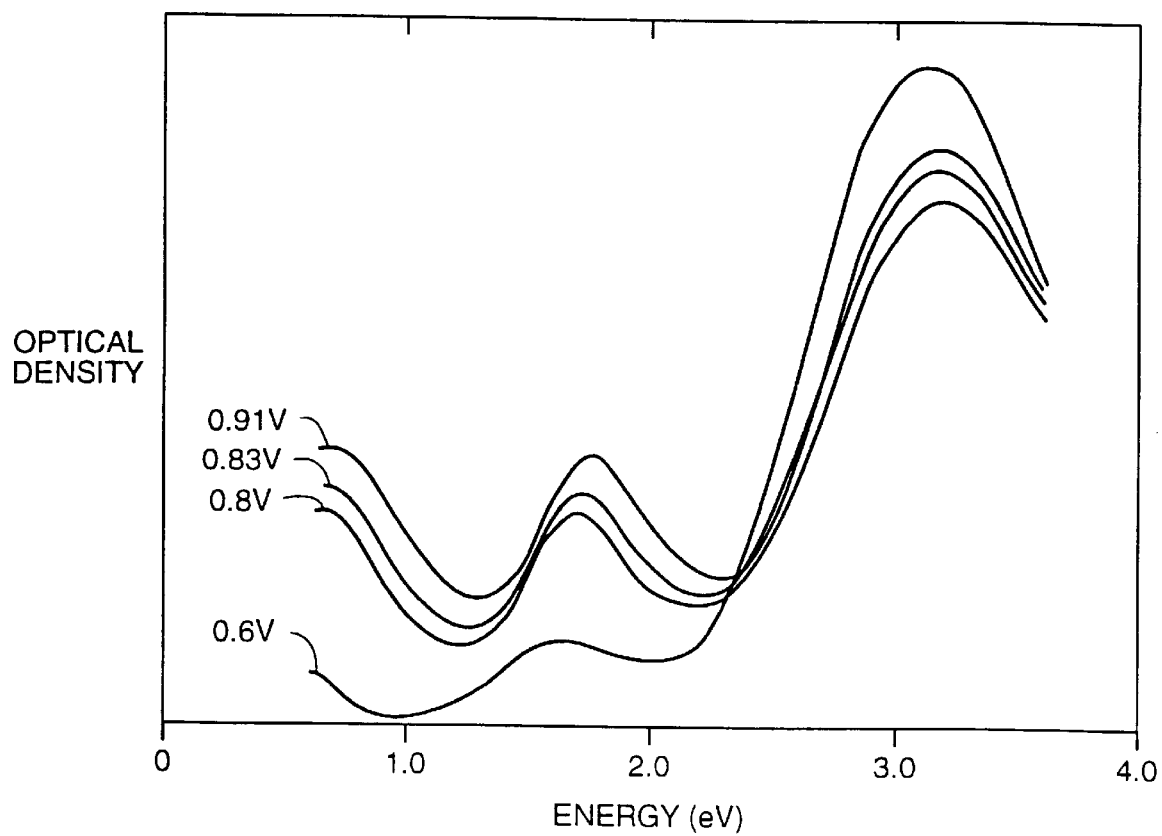
FIG._9

METHOD OF MAKING SELF-DOPED ZWITTERIONIC HETEROCYCLIC POLYMERS

This is a divisional of copending applications, application Ser. No. 08/336,328, filed Nov. 8, 1994, which is a continuation of application Ser. No. 08/016,658, filed on Feb. 9, 1993, now abandoned, which is a continuation of U.S. application Ser. No. 07/607,851, filed on Nov. 1, 1990, now abandoned, which is a continuation of U.S. Ser. No. 07/156,928, filed Dec. 14, 1987, now abandoned, which claims priority on International application PCT/US86/02042, filed on Sep. 29, 1986, which claims priority on Japanese patent application 64272/86, filed on Mar. 24, 1986.

FIELD OF THE INVENTION

This invention relates generally to the field of conducting polymers. More particularly the invention relates to self-doped conjugated polymers in which Bronsted acid groups are covalently bound to the backbone of the polymer.

BACKGROUND

The requirements for conductive polymers used in the electronic and other industries are becoming more and more stringent. There is also an increasing need for materials which permit reduction in the size and weight of electronic parts and which themselves exhibit long-term stability and superior performance.

In order to satisfy these demands, active efforts have been made in recent years to develop new conductive macromolecular or polymeric materials. A number of proposals have also been made regarding the potential uses of such new compounds. For example. P. J. Nigrey et al. in *Chem. Comm.* pp. 591 et seq. (1979) have disclosed the use of polyacetylenes as secondary battery electrodes. Similarly, in the *J. Electro Chem. Soc.*, p. (1981) et seq. (1651) and in Japanese Patent Application Nos. 136469/1981, 121168/1981, 3870/1984, 3872/1984, 3873/1984, 196566/1984, 196573/1984, 203368/1984, and 203369/1984, have also disclosed the use of polyacetylenes, Schiff base-containing quinazone polymers, polarylene quinones, poly-p-phenylenes, poly-2, 5-thienylenes and other polymeric materials as electrode materials for secondary batteries.

The use of polymeric materials in electrochromic applications has also been suggested, in, e.g., A. F. Diaz et al., *J. Electroanal. Chem.* 111: 111 et seq. (1980). Yoneyama et al., *J. Electroanal. Chem.* 161, p. 419(1984) (polyaniline), A. F. Diaz et al., *J. Electroanal. Chem.* 149: 101 (1983) (polypyrrole). M. A. Druy et al., *Journal de Physique* 44: C3-595 (June 1983). and Kaneto et al., *Japan Journal of Applied Physics* 22(7): L412 (1983) (polythiophene).

These highly conductive polymers known in the art are typically rendered conductive through the process of doping with acceptors or donors. In acceptor doping, the backbone of the acceptor-doped polymer is oxidized, thereby introducing positive charges into the polymer chain. Similarly, in donor doping, the polymer is reduced, so that negative charges are introduced into the polymer chain. It is these mobile positive or negative charges which are externally introduced into the polymer chains that are responsible for the electrical conductivity of the doped polymers. In addition, such "p-type" (oxidation) or "n-type" (reduction) doping is responsible for substantially all the changes in electronic structure which occur after doping, including, for example, changes in the optical and infrared absorption spectra.

Thus, in all previous methods of doping the counterions are derived from an external acceptor or donor functionality. During electrochemical cycling between neutral and ionic states. then, the counterions must migrate in and out of the bulk of the polymer. This solid state diffusion of externally introduced counterions is often the rate-limiting step in the cycling process. It is thus desirable to overcome this limitation and thereby decrease the response time in electrochemical or electrochromic doping and undoping operations. It has been found that the response time can be shortened if the period required for migration of counterions can be curtailed. The present invention is predicated upon this discovery.

SUMMARY OF THE INVENTION

The present invention provides conducting polymers that can be rapidly doped and undoped, and which are capable of maintaining a stable, doped state for long periods of time relative to conducting polymers of the prior art. The superior properties of the polymers of the present invention result from the discovery that conducting polmers can be made in a "self-doped" form: i.e., the counterion that provides conductivity can be covalently linked to the polymer itself. In contrast to the polymers of the prior art, therefore, the need for externally introduced counterions is obviated, and the rate-limiting diffusion step alluded to above is eliminated as well.

The polymers of the invention can display conductivities of on the order of at least about 1 S/cm. The self-doped polymers may be used as electrodes in electrochemical cells, as conductive layers in electrochromic displays, field effective transistors. Schottky diodes and the like, or in any number of applications where a highly conductive polymer which exhibits rapid doping kinetics is desirable.

In its broadest aspect, the present invention is directed to a conducting self-doped polymer having along its backbone a π-electron conjugated system which comprises a plurality of monomer units, between about 0.01 and 100 mole % of said units having covalently linked thereto at least one Bronsted acid group. The present invention also encompasses the zwitterionic form of such polymers. Polymers which may form the backbone of the compounds of the present invention include, for example, polypyrrole, polythiophenes, polyisothianaphthenes polyanilines, poly-p-phenylenes and copolymers thereof.

In a preferred embodiment, self-doped polymers described above have a recurring structure selected from the following structures (I) or (II):

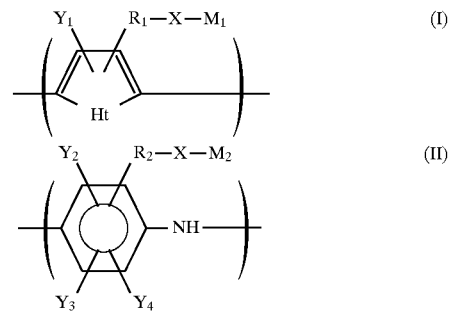

wherein, in Formula I: Ht is a heterogroup: $Y_1$ is selected from the group consisting of hydrogen and —$R_1$—X—$M_1$; $M_1$ is an atom or group which when oxidized yields a positive monovalent counterion; X is a Bronsted acid anion: and $R_1$ is a linear or branched alkylene, ether, ester or amide moiety having between 1 and about 10 carbon atoms. In Formula II, $Y_2$, $Y_3$ and $Y_4$ are independently selected from the group consisting of hydrogen and —$R_2$—X—$M_2$, $R_2$ is a direct bond, a linear or branched alkylene, ether, ester or amide moiety having between 1 and about 10 carbon atoms, and $M_2$ is an atom or group which when oxidized yields a positive monovalent counterion.

In yet another preferred embodiment of the invention, a conductive polymer is provided containing a recurring zwitterionic structure according to (Ia) or (IIa):

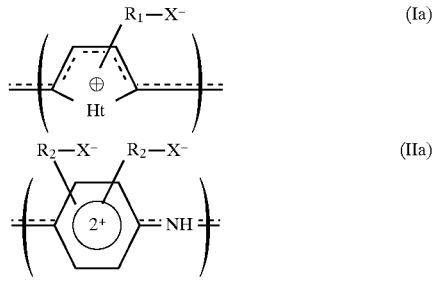

wherein Ht, $R_1$, $R_2$ and X are as defined above.

The invention is also directed to monomers useful in making the above self-doped polymers, methods of synthesizing the polymers, and devices employing the polymers.

BRIEF DESCRIPTION OF THE DRAWINGS

FIG. 1 is an infrared spectrum of poly(methylthiophene-3-(2-ethanesulfonate)):

FIG. 2 is an infrared spectrum of poly(thiophene-3-(2-ethanesulfonic acid sodium salt)):

FIG. 3 is an infrared spectrum of poly(methyl thiophene-3-(4-butanesulfonate)):

FIG. 4 is an infrared spectrum of poly(thiophene-3-(4-butanesulfonic acid sodium salt)):

FIG. 5 depicts a series of vis-near ir spectra of poly(thiophene-3-(2-ethanesulfonic acid sodium salt)):

FIG. 6 depicts a series of vis-near ir spectra of poly(thiophene-3-(4-butanesulfonic acid sodium salt)):

FIG. 7 depicts a series of vis-near ir spectra of poly(methylthiophene-3-(4-butane sulfonate)):

FIG. 8 illustrates the results of cyclic voltammetry carried out on films of poly(thiophene-3-(2-ethanesulfonic acid)); and FIG. 9 depicts a series of vis-near ir spectra of poly(thiophene-3-(2-ethanesulfonic acid).

DETAILED DESCRIPTION

The terms "conducting" or "conductive", indicate the ability to transmit electric charge by the passage of ionized atoms or electrons. "Conducting" or "conductive" compounds include compounds which embody or incorporate mobile ions or electrons as well as compounds which may be oxidized so as to embody or incorporate mobile ions or electrons.

The term "self-doping" means that a material may be rendered conducting or conductive without external introduction of ions by conventional doping techniques. In the self-doping polymers disclosed herein, potential counterions are covalently bound to the polymer backbone.

The term "Bronsted acid" is used to refer to a chemical species which can act as a source of one or more protons. i.e. as a proton-donor. See. e.q., the McGraw-Hill Dictionary of Scientific and Technical Terms (3rd Ed. 1984) at page 220. Examples of Bronsted acids thus include carboxylic, sulfonic and phosphoric acids.

The term "Bronsted acid group" as used herein means Bronsted acids as defined above, anions of Bronsted acids (i.e. where the protons have been removed), and salts of Bronsted acids, in which a Bronsted acid anion is associated with a monovalent cationic counterion.

"Monomer units" as used herein refer to the recurring structural units of a polymer. The individual monomer units of a particular polymer may be identical, as in a homopolymer, or different, as in a copolymer.

The polymers of the present invention, which may be copolymers or homopolymers, have a backbone structure that provides a π-electron conjugated system. Examples of such polymer backbones include, but are not limited to, polypyrroles, polythiophenes, polyisothianaphthenes, polyanilines, poly-p-phenylenes and copolymers thereof. The recurring structure described above may constitute anywhere from about 0.01 to about 100 mole % monomers substituted with one or more —$R_1$—X—$M_1$ or $R_2$—X—$M_2$ functionalities. In applications requiring high conductivity, usually at least about 10 mole % of the monomer units are substituted, typically about 50 to 100 mole %. In semiconductor applications, it is usually less than about 10 mole % of the monomer units that are substituted, sometimes as little as about 0.1 or about 0.01 mole %.

Polyheterocycle monomer units represented by Formulae I and Ia include monomer units which are either mono-substituted or di-substituted with the —$R_1$—X—$M_1$ functionality. Similarly, the polyaniline monomer units represented by Formulae II and IIa include monomer units which are substituted with 1, 2, 3 or 4 —$R_2$—X—$M_2$ substitutents. Copolymers encompassing these different types of substituted monomer units are envisioned by the present invention as well. In both the homopolymers and copolymers of the present invention, between about 0.01% is and 100 mole % of the polymer should be provided with Bronsted acid groups.

In a preferred embodiment, the present invention encompasses electrically neutral polymers given by Formula I or II above. In order to render the polymers conductive, they must be oxidized so as to remove the $M_1$ or $M_2$ moiety and yield a polymer containing a recurring zwitterionic structure according to Ia or IIa. In the preferred embodiment, for example, Ht may be selected from the group consisting of NH, S, O, Se and Te: $M_1$ and $M_2$ each are selected from H, Na, Li or K; X may be $CO_2$, $SO_3$ or $HPO_3$; and $R_1$ is a straight chain alkylene or ether group (i.e., —$(CH_2)_x$— or —$(CH_2)_yO(CH_2)_z$—, where x and (y+z) are from 1 to about 10), and is a same divalent $R_1$ group as cited above when $R_2$ is present. In a particularly preferred embodiment, Ht is NH or S; $M_1$ and $M_2$ are each H, Li or Na; X is $CO_2$ or $SO_3$; $R_1$ and $R_2$ are each a linear alkyl having from 2 to about.4 carbon atoms; and the substituted monomer units of the polymers are either mono- or di-substituted with $R_1$—X—$M_1$ or $R_2$—X—$M_2$ groups.

In order to "undope" the zwitterionic form of the polymers, an electric charge may be supplied in the direction contrary to that used in doping (alternatively, a mild reducing agent may be used as discussed below). The $M_1$ or $M_2$ moiety is caused to migrate into the polymer and neutralize the $X^-$ counterion. The undoping process is thus as rapid as the doping process.

Scheme I and Scheme II represent the oxidation and reduction of the above polymers (the mono-substituted embodiment is illustrated), i.e. the transition between the electrically neutral and conductive zwitterionic forms:

Scheme I

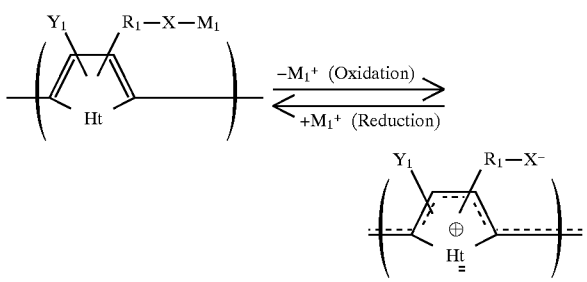

Scheme II

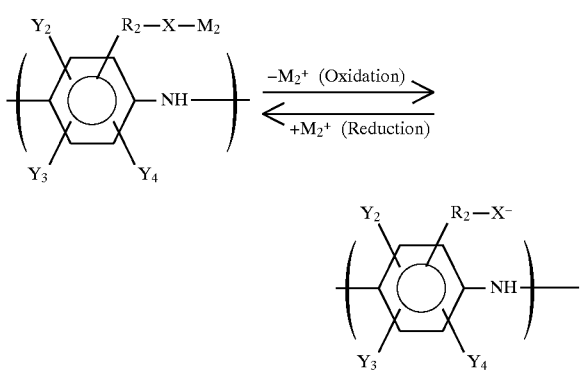

Where X is $CO_2$, the above electrochemical conversion is strongly pH-dependent in the pH range of 1–6 (the $PK_a$ for $X=CO_2$ and $M_1=H$ in Formula I is about 5). Where X is $SO_3$, on the other hand, the above electrochemical reaction is pH-independent over the much larger pH range of about 1–14 (the $pK_a$ for $X=SO_3$ and $M_2=H$ in Formula II is about 1). The sulfonic acid derivative is thus charged at virtually any hydrogen ion concentration, while the carboxylic acid derivative is charged at only lower hydrogen ion concentration. By varying the pH of the polymer solution, then, it is easier to control the conductivity of the carboxylic acid derivatives than that of the corresponding sulfonic acid derivatives. The particular Bronsted acid moiety selected will thus depend on the particular application.

These self-doped polymers have conductivities of at least about 1 S/cm (see Example 14) and typically have chain lengths of about several hundred monomer units. Typically, chain lengths range from about 100 to about 500 monomer units; higher molecular weights are preferred.

In the practice of the present invention, a Bronsted acid group is introduced into a polymer to make it self-doping. The Bronsted acid may be introduced into a monomer, followed by polymerization or copolymerization. One may also prepare a polymer or copolymer of the unsubstituted monomers of Formulae I or II and then introduce the Bronsted acid into the polymer backbone.

Covalently linking a Bronsted acid to a monomer or polymer is within the skill of the art. See. e.g., *J.Am.Chem. Soc.* 70:1556 (1948). By way of illustration, an alkyl group on a monomer or polymer backbone can be concatenated to an alkyl halide using N-bromo succinamide (NBS) as shown in Scheme III:

Scheme III

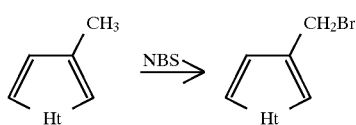

The halide can then be treated with sodium cyanide/sodium hydroxide or sodium sulfite followed by hydrolysis to give a carboxylic or sultonic Bronsted acid, respectively, as shown in Scheme IV:

Scheme IV

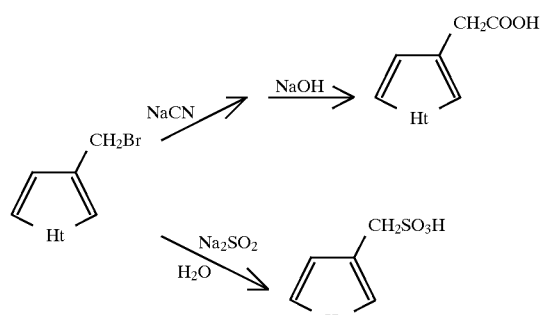

Another example showing the addition of a Bronsted acid group with an ether linking group is shown in Scheme V:

Scheme V

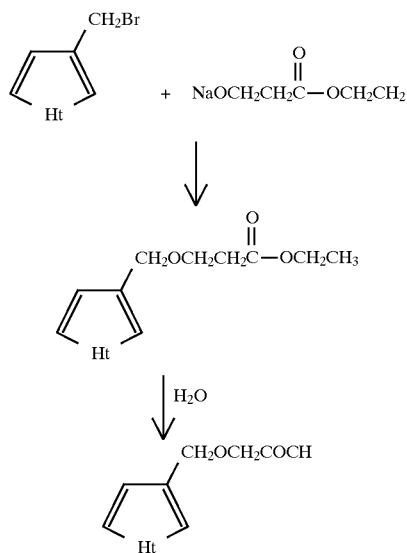

Syntheses of various monomers useful in the practice of the present invention are set forth in Examples 1 through 12, below.

The polymers of the present invention may be synthesized by the electrochemical methods set forth in, e.g., S. Hotta et al., *Synth. Metals* 9:381 (1984), or by chemical coupling methods such as those described in Wudl et al., *J. Orq. Chem.* 49:3382 (1984). Wudl et al., Mol. Cryst. Liq. Cryst. 118:199 (1985) and M. Kobayashi et al., *Synth. Metals*. 9:77 (1984).

When synthesized by electrochemical methods (i.e., anodically), the polymeric zwitterions are produced directly.

With the chemical coupling methods, the neutral polymers result. The preferred synthetic method is electrochemical, and is exemplified below by the production of a substituted polyheterocyclic species.

A solution containing the monomer III

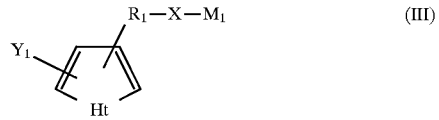

with Ht, $Y_1$, $R_1$, X and $M_1$ and M as given above, is provided in a suitable solvent such as acetonitrile (particularly suitable for the sulfonic acid derivative, i.e. where $X=SO_3$) along with an electrolyte such as tetrabutylammonium perchlorate or tetrabutylammonium fluoroborate. A working electrode of platinum, nickel, indium tin oxide (ITO)-coated glass or other suitable material is provided, as is a counter electrode (cathode) of platinum or aluminum, preferably platinum. A current of between about 0.5 and 5 mA/cm² is applied across the electrodes, and depending on the extent of polymerization desired (or the thickness of the polymeric film on a substrate), the electropolymerization reaction is carried out for between a few minutes and a few hours. The temperature of the polymerization reaction can range from about $-30°$ C. to about $25°$ C., but is preferably between about $5°$ C. and about $25°$ C.

Reduction of the zwitterionic polymer so produced to the neutral, undoped form may be effected by electrochemical reduction or by treatment with any mild reducing agent, such as methanol or sodium iodide in acetone. This process should be allowed to proceed for at least several hours in order to ensure completion of the reaction.

The sulfonic acid monomer ($X=SO_3$) is polymerized as the alkyl ester having 1 to 2 carbon atoms, such as the methyl ester (see Examples 14 and 15). while the carboxylic acid derivative ($X=CO_2$) may be prepared in its acid form. After polymerization of the sulfonic acid derivative, the methyl group is removed in the treatment with sodium iodide or the like.

The polyanilines represented by Formulae II and IIa may be synthesized electrochemically as above or they may be prepared by the reaction of a phenylenediamine with a suitably substituted cyclohexanedione. Scheme VI, below, illustrates this latter synthesis:

Scheme VI

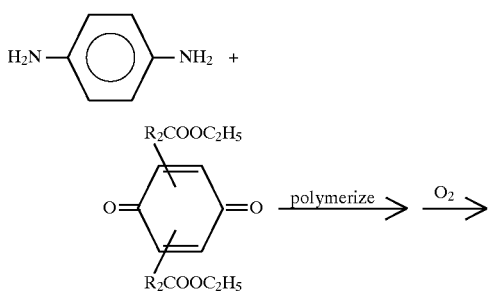

-continued
Scheme VI

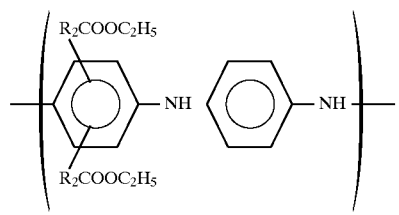

$R_2$ and $M_2$ are as defined above.

Copolymerization of different types of monomers represented in Formulae I or II may be effected according to the same procedures outlined above. In a preferred embodiment, the majority of monomers are at least mono-substituted with an —$R_1$—X—$M_1$ or —$R_2$—X—$M_2$ group as described.

Composites of the polymers of Formulae I and II may be prepared in conjunction with water-soluble polymers such as polyvinyl alcohol (see Example 17) and the polysaccharides. Because the polymers of the present invention may be fairly brittle, preparation of composites using additional polymeric materials provides polymers which are more flexible and less brittle. Films may be cast from aqueous solutions of polymers given by Formulae I or II also containing a predetermined amount of one or more additional water-soluble polymers. Since the key procedural criterion in this step is dissolving two or more polymers in water, the only practical limitation on the additional polymers is that they be water-soluble.

The polymers of the present invention offer a specific advantage over conventional conducting polymers for use as electrodes in electrochemical cells. Because the counterions are covalently bound to the polymer, the cell capacity is not limited by electrolyte concentration and solubility. This means that in optimized cells, the total amount of electrolyte and solvent can be reduced considerably, thus enhancing the energy density of the resulting battery. The facile kinetics of ion transport provided by the novel self-doping mechanism leads to rapid charge and discharge as well as to faster electrochromic switching. Electrodes fabricated using the polymers of the invention may be fabricated entirely from these polymers or from conventional substrates coated with these polymers. Conventional substrates may include. for example, indium tin oxide coated glass, platinum, nickel, palladium or any other suitable anode materials. When used as an electrode, the internal self-doping of the polymer effects the transition represented by Scheme I.

The self-doped conducting polymers of the invention also offer specific advantages over conventional conducting polymers for use in a variety of device applications where long term performance requires that the dopant ions not be continuously mobile. Examples of such uses include fabrication of Schottky diodes, field effective transistors, etc. Because the dopant ion is covalently bound to the polymer chain in self-doped polymers, the problem of diffusion of the ion (e.g., in the vicinity of a junction or interface) is solved.

EXAMPLES

It is to be understood that while the invention has been described in conjunction with the preferred specific embodiment thereof, that the foregoing description as well as the examples which follow are intended to illustrate and not limit the scope of the claimed invention. Other aspects, advantages and modifications within the scope of the invention will be apparent to those skilled in the art to which the invention pertains.

Example 1

2-(3-Thienyl)-Ethyl Methanesulfonate

To a solution of 5.0 g ($7.8 \times 10^{-3}$ mol) of 2-(3-thienyl)-ethanol (Aldrich Chemical) in 10 ml of dry, freshly distilled pyridine was added 3.62 ml (1.2 equiv.) of methanesulfonyl chloride in 20 ml of pyridine at 5°–10° C. The addition was carried out gradually, over a period of about 15–20 min. The reaction mixture was stirred overnight at room temperature and was quenched by pouring into a separatory funnel containing water and ether. The layers were separated and the aqueous layer was extracted three times with ether. The combined organic extracts were extracted once with 10% hydrochloric acid, followed by water and drying over $Na_2SO_4$ Evaporation of the solvent afforded 5.3 g of a light brown oil (65% yield), and tlc ($CHCl_3$) showed a single spot. Chromatographic purification on silica gel afforded a light yellow oil. Nmr ($CDCl_3$. δ rel TMS) 2.9s, 3H; 3.1t, 2H; 4.4t, 2H; 7.0–7.4m, 3H. Ir (neat, ν $cm^{-1}$) 3100w, 2930w, 2920w, 1415w, 1355s, 1335s, 1245w, 1173s, 1080w, 1055w, 970s, 955s, 903m, 850m, 825w, 795s, 775s, 740w, MS, 206.0.

Example 2

2-(3-Thienyl)-Ethyl Iodide

The above methanesulfonate (5.3 g), $2.6 \times 10^{-2}$ mol) was added to a solution of 7.7g (2 equiv) of NaI in 30 ml of acetone and allowed to react at room temperature for 24 hr. The $CH_3SO_3Na$ which had precipitated was separated by filtration. The filtrate was poured into water, extracted with chloroform, and the organic layer was dried over $MgSO_4$. Evaporation of the solvent afforded a light brown oil which upon chromatographic purification gave 5.05 g of a light yellow oil (82.5%). Nmr ($CDCl_3$, δ rel to TMS): 3.2m, 4H; 7.0–7.4m, 3H. Ir (KBr, ν $cm^{-1}$): 3100m, 2960s, 2920s, 2850w, 1760w, 1565w, 1535w, 1450m, 1428s, 1415s, 1390w, 1328w, 1305w, 1255s, 1222m, 1170s, 1152m, 1100w, 1080m, 1020w, 940w, 900w, 857s, 840s, 810w, 770s, 695s, 633m, MS 238.

Example 3

Sodium-2-(3-Thienyl)-Ethanesulfonate

To a 10 ml aqueous solution of 5.347 g ($4.2 \times 10^{-2}$ mol) of $Na_2SO_3$ was added 5.05 g (0.5 equiv) of the above iodide and the reaction mixture was heated to 70° C. for 45 hr. The resulting mixture was evaporated to dryness followed by washing with chloroform to remove the unreacted iodide (0.45 g) and acetone to remove the sodium iodide. The remaining solid was a mixture of the desired sodium salt contaminated with excess sodium sulfite and was used in subsequent steps without further purification. Nmr ($D_2O$, δ rel TMS propanesulfonate): 3.1s, 4H; 7.0–7.4m, 3H. Ir (KBr, ν, $cm^{-1}$, $Na_2SO_3$ peaks subtracted) 1272m, 1242s, 1210s, 1177s, 1120m, 1056s, 760m, 678w.

Example 4

2-(3-Thienyl)-Ethanesulfonyl Chloride

To a stirred suspension of 2 g of the above mixture of salts prepared in Example 3 was added dropwise 2 ml of distilled thionyl chloride. The mixture was allowed to stir for 30 min. The white solid resulting from ice-water quench was separated by filtration and recrystallized from chloroform-hexane to afford 800 mg of white crystals, mp 57°–58° C. Nmr ($CDCl_3$, δ rel TMS) 3.4m, 2H; 3.9m, 2H; 7.0–7.4m, 3H. Ir (KBr, ν, $cm^{-1}$) 3100w, 2980w, 2960w, 2930w, 1455w, 1412w, 1358s, 1278w, 1260w, 1225w, 1165s, 1075w, 935w, 865m, 830m, 790s, 770w, 750m, 678s, 625m, El. Anal. Calcd. for $C_6H_7ClO_2S_2$: C, 34.20; H, 3.35; Cl, 16.83; S, 30.43. Found: C, 34.38; H, 3.32: Cl, 16.69; S, 30.24.

Example 5

Methyl 2-(3-Thienyl)-Ethanesulfonate (e.g. methyl thiophene-3-(2-ethanesulfonate))

To a stirred solution of 105 mg ($5 \times 10^{-4}$ mol) of the above acid chloride (prepared in Example 4) in 1.5 ml of freshly distilled (from molecular sieves) methanol was added, at room temperature, 1.74 ml (2 equiv) of N,N-diisopropylethylamine. The reaction mixture was stirred for 12 hr and then transferred to a separatory funnel containing dilute, aqueous HCl and was extracted with chloroform thrice. After the combined organic layers were dried with $Na_2SO_4$, the solvent was evaporated to afford a light brown oil which was purified by chromatography on silica gel with chloroform as eluent. The resulting colorless solid, obtained in 90% yield had an mp of 27°–28.5° C. Ir (neat film, ν $cm^{-1}$) 3100w, 2960w, 2930w, 1450m, 1415w, 1355s, 1250w, 11656s, 985s, 840w, 820w, 780m, 630w, 615w, Uv-vis [λmax, MeOH, nm(ε)] 234 ($6 \times 10^3$). Nmr ($CDCl_3$, δ rel TMS) 7.42–7.22q, 1H; 7.18–6.80m, 2H; 3.85s, 3H; 3.6–2.9m, 4H. El. Anal. Calcd. for $C_7H_{10}O_3S_2$: C, 40.76; H, 4.89; S, 31.08. Found: C, 40.90; H, 4.84; S, 30.92.

Example 6

Ethyl-2-Carboxyethyl-4-(3-Thienyl)-Butanoate

To a stirred solution of 11.2 g (69.94 mmol) of diethyl malonate in 60 ml of freshly distilled DMF, was added 2.85 g (69.94 mmol) of a 60% oil dispersion of NaH. After 30 min stirring, 15.86 g (66.61 mmol) of 2-(3-thienyl)-ethyl iodide (prepared as described above) in 20 ml of DMF was added dropwise over 10 min. The reaction mixture was stirred at room temperature for one hr and then heated to 140° for four hr. Upon cooling, the reaction was poured into ice-dil. HCl and extracted six times with ether. The combined organic layers were washed with water, dried with $Na_2SO_4$ and evaporated to afford a brown oil. After chromatography on silica gel (50% hexane in chloroform), a colorless oil was obtained in 98% yield. El. Anal. Calcd. for $C_{13}H_{18}O_4S$: C, 57.76; H, 6.71; S, 11.86. Found: C, 57.65; H, 6.76; S, 11.77. Nmr ($CDCl_3$, δ rel TMS) 7.40–7.20t, 1H; 7.10–6.86d, 2H; 4.18q, 4H; 3.33t, 1H; 2.97–1.97m, 4H; 1.23t, 6H. Ir (neat film, ν $cm^{-1}$) 2980w, 1730s, 1450w, 1370w, 775w.

Example 7

2-Carboxy-4-(3-Thienyl)-Butanoic Acid

To a stirred solution of 1.4 g (24.96 mamol) of potassium hydroxide in 7.0 ml of 50% ethanol in water, was added the above diestet (765 mg, 2.83 mmol) prepared in Example 6. The resulting reaction was allowed to stir at room temperature for two hr, followed by overnight reflux. The resulting mixture was poured into ice-10% HCl, followed by three ether extractions. The combined organic layer was dired with $Na_2SO_4$ and evaporated to afford a white solid in 90% which was recrystallized from chloroform-hexane to produce colorless needles. Mp, 118°–119° C.; nmr (DMSO/d6, δ rel TMS) 12.60br s, 2H; 7.53–6.80m, 3H; 3.20t, 1H; 2.60t, 2H; 1.99q, 2H. Ir (KBr, ν $cm^{-1}$) 2900w, 1710s, 1410w, 1260w, 925w, 780s, El. Anal. Calcd. for $C_9H_{10}O_4S$: C, 56.45; H, 5.92; S, 18.83. Found: C, 56.39; H, 5.92; S, 18.67.

Example 8

4-(3-Thienyl)-Butyl Methanesulfonate 4-(3-thienyl)-butanoic acid (CA 69:18565x, 72:121265k) was prepared by standard thermal decarboxylation of the carboxy acid prepared in Example 7. This compound was then reduced to give 4-(3-thienyl)-butanol (CA 70:68035r. 72: 121265k) also using standard methods.

To a solution of 1.05 g ($6.7 \times 10^{-3}$ mol) of 4-(3-thienyl)-butanol in 25 ml of dry, freshly distilled pyridine was added 0.85 g (1.1 equiv.) of methane-sulfonyl chloride at 25° C. The addition was gradual and carried out over a several minute period. The reaction mixture was stirred for 6 hr at room temperature and quenched by pouring into a separtory funnel containing water-HCl and ether. The layers were separated and the aqueous layer was extracted once with 10L hydrochloric acid, followed by extraction with water and drying with $Na_2SO_4$ Evaporation of the solvent afforded 1.51 g of a light brown oil (95% yield), tlc ($CHCl_3$) showed a single spot. El. Anal. Calcd. for $C_9H_{14}O_3S_2$: C, 46.13; H, 6.02; S, 27.36. Found: C, 45.92; H, 5.94: S, 27.15. Nmr ($CDCl_3$, δ rel TMS) 2.0–1.5 brs, 4H; 2.67 brt, 2H; 2.97s, 3H; 4.22t, 2H; 7.07–6.80d, 2H; 7.37–7.13, 1H.

Example 9

4-(3-Thienyl Butyl Iodide)

The above methanesulfonate (1.51 g. $6.4 \times 10^{-3}$ mol) prepared in Example 8 was added to a solution of 1.93 g (2 equiv.) of NaI in 14 ml of acetone and allowed to react at room temperature overnight. The reaction mixture was then heated to reflux for 5 hr. The $CH_3SO_3Na$ which had precipitated was separated by filtration. The filtrate was poured into water, extracted with chloroform and the organic layer, was dried with $MgSO_4$. Evaporation of the solvent afforded a light brown oil which upon chromatographic purification (silica gel, 60% hexane in chloroform) gave 1.34 g of a colorless oil (78%). Nmr ($CDC_3$, δ rel to TMS) 1.53–2.20m, 4H; 2.64t, 2H; 3.17t, 2H; 6.83–7.10d, 2H; 7.13–7.37t, 1H. Ir (KBr, ν $cm^{-1}$) 2960s, 2905s, 2840s, 1760w, 1565w, 1535w, 1450s. 1428s, 1415s, 1190s, 750s, 695m, 633m. MS 266.0. El. Anal. Calcd. for $C_8H_{11}IS$: C, 36.10; H, 4.17; I, 47.68; S, 12.05. Found: C, 37.68; H, 4.35; I, 45.24; S, 12.00

Example 10

Sodium-4-(3-Thienyl)-Butanesulfonate

To a 2 ml aqueous solution of 1.271 g ($1 \times 10^{-2}$ mol) of $Na_2SO_3$ was added 1.34 g (0.5 equiv) of the above iodide prepared in Example 9. The reaction mixture was heated to reflux for 18 hr. The resulting mixture was evaporated to dryness, followed by washing with chloroform to remove the unreacted iodide and with acetone to remove the sodium iodide. The remaining solid was a mixture of the desired sodium salt contaminated with excess sodium sulfite and was used in subsequent steps without further purification. Nmr ($D_2O$, δ rel TMS propane-sufonate) 1.53–1.97m, 4H; 2.47–3.13m, 4H; 6.97–7.20d, 2H; 7.30–7.50q, 1H. Ir (KBr, ν $cm^{-1}$, $Na_2SO_3$ peaks subtracted) 2905w, 1280m, 1210s, 1180s, 1242m, 1210s, 1180s, 1130s, 1060s, 970s, 7700s, 690w, 630s, 605s.

Example 11

4-(3-Thienyl)-Butanesulfonyl Chloride

To a stirred suspension of 1.00 g of the above mixture of salts (from Example 10) in 10 ml of freshly distilled DMF was added dropwise 1.43 g of distilled thionyl chloride. The mixture was allowed to stir for 3 hr. The slightly yellow oil resulting from ice-water quench was isolated by twice extracting with ether, followed by drying of the organic layer with $Na_2SO_4$ to yield 566 mg of a slightly yellow oil which crystallized slowly (mp 26°–27°) after chromatography (silica gel. chloroform). Nmr ($CDCl_3$, δ rel TMS) 1.45–2.38m, 4H; 2.72t, 2H; 3.65t, 2H; 6.78–7.12d, 2H; 7.18–7.42, 1H. Ir (neat film, ν $cm^{-1}$) 3120w, 2920s, 2870m, 1465m, 1370s, 1278w, 1260w, 1160s, 1075w, 935w, 850w, 830m, 7765s, 680m, 625w, 585s, 535s, 510s, El. Anal. Calcd. for $C_8H_{11}ClO_2S_2$: C, 40.25; H, 4.64; Cl, 14.85; S, 26.86. Found: C, 40.23; H, 4.69; Cl, 14.94; S, 26.68.

Example 12

Methyl 4-(3-Thienyl)-Butanesulfonate (e.g. methyl thiophene-3-(4-butanesulfonate))

To a stirred solution of 362 mg ($1.5 \times 10^{-1}$ mol) of the above acid chloride prepared in Example 11 in 6 ml of freshly distilled (from molecular sieves) methanol was added, at room temperature, 392 mg (2 equiv) of N,N-diisopropylethylamine. The reaction mixture was stirred for 2 hr and then transferred to a separatory funnel containing dilute, aqueous HCl and was extracted with chloroform thrice. After the combined organic layers were dried with $Na_2SO_4$, the solvent was evaporated to afford a light brown oil which was purified by chromatography on silica gel with 40% hexane in chloroform as eluent. The resulting colorless oil, obtained in 84% yield had the following properties: El. Anal. Calcd. for $C_9H_{14}S_2O_3$: C, 46.13; H, 6.02; S, 27.36. Found: C, 45.97; H, 5.98; S, 27.28. Ir (neat film, ν cm ) 3100w, 2970m, 2860w, 1460m, 1410w, 1350s, 1250w, 1160s, 982s, 830m, 800m, 770s, 710w, 690w, 630w, 613w, 570m, Uv-vis [λmax, MeOH, nm (ε)] 220 ($6.6 \times 10^3$). Nmr ($CDCl_3$, δ rel to TMS) 7.33–7.13 (t, 1H), 7.03–6.77 (d, 2H), 3.83 (s, 3H), 3.09 (t, 2H), 2.67 (t,2 H), 2.2–1.5 (m, 4H).

Example 13

Polymerization of Thiophene-3-Acetic Acid

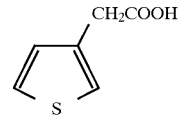

IV

Thiophene-3-acetic acid (Formula IV) was polymerized at room temperature by the electrochemical polymerization method of S. Hotta et al., *Synth. Metals*, supra, using acetonitrile as the solvent and $LiClO_4$ as the electrolyte. Blue-black films were produced, indicating formation of the zwitterionic polymer of Formula Ia, ($Y_1$=H, $R_1$=—$CH_2$—, Ht=S, and X=$CO_2$. The polymer films were electrochemically cycled and observed to undergo a color change from blue-black to yellowish brown, indicating reduction of the zwitterionic form of the polymer to the neutral form represented by Formula I. The infrared spectrum was in agreement with the proposed structure.

Example 14

Poly(Thiophene-3-(2-Ethanesulfonic Acid Sodium Salt))

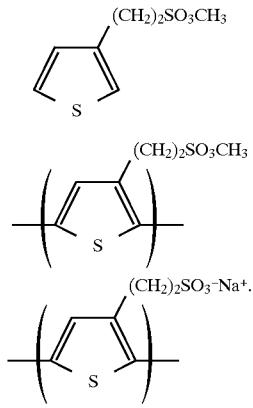

Methyl thiophene-3-(2-ethanesulfonate) (Formula V) was prepared as above. Polymerization of the above monomer was carried out as in Example 13, except that the polymerization temperature was maintained at −27° C. The resultant polymer ("methyl P3-ETS", Formula VI) was then treated with sodium iodide in acetone to remove the methyl group from the sulfonic acid functionality and produce, in quantitative yield (~98%), the corresponding sodium salt of the polymer, i.e. of poly(thiophene-3-(2-ethanesulfonic acid)) ("P3-ETSNa") as shown in Formula VII. The polymeric methyl ester and the polymeric sodium salt were characterized by infrared and ultraviolet spectroscopy as well as by elemental analysis (see FIGS. 1 and 2). The sodium salt was found to be soluble in all proportions in water, enabling the casting of films from aqueous solution.

Electrochemical cells were constructed in glass to demonstrate electrochemical doping and charge storage via in situ optoelectrochemical spectroscopy. The cells included a film of the above polymer on ITO-coated glass (which served as the anode), a platinum counterelectrode (cathode) and a silver/silver chloride reference electrode with tetrabutylammonium perchlorate as electrolyte. FIG. 5 depicts a series of vis-near ir spectra of the P3-ETSNa taken with the cell charged to a series of successively higher open circuit voltages. The results were typical of conducting polymers in that the π–π* transition was depleted with a concomitant shift of oscillator strength into two characteristic infrared bands. The results of FIG. 5 demonstrate both reversible charge storage and electrochromism.

The electrical conductivity was measured with the standard 4-probe techniques using a film of the polymer cast from water onto a glass substrate onto which gold contacts had been previously deposited. upon exposure to bromine vapor, the electrical conductivity of P3-ETSNa rose to ~1 S/cm.

Example 15

Poly(Thiophene-3-(4-Butanesulfonic Acid Sodium Salt))

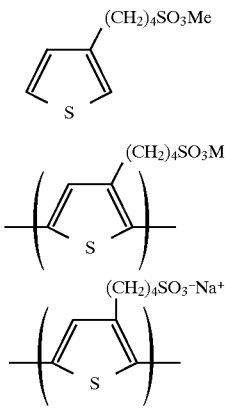

Methyl thiophene-3-(4-butanesulfonate) (Formula VIII) was prepared as above. Polymerization was carried out under conditions identical to those set forth in Examples 13 and 14 above. The resultant polymer (designated "methyl P3-BTS", Formula IX) was treated with sodium iodide in acetone to produce, in quantitative yield, the sodium salt of poly( thiophene-3-(4-butanesulfonic acid)) ("P3-BTSNa", Formula X). The polymeric methyl ester (Formula IX) and the corresponding sodium salt (Formula X) were characterized spectroscopically (ir, uv-vis) and by elemental analysis. The sodium salt was discovered to be soluble in all proportions in water, enabling the casting of films from aqueous solution.

Electrochemical cells were constructed as in Example 14 in order to demonstrate electrochemical doping and charge storage via in situ optoelectrochemical spectroscopy. FIGS. 6 and 7 depict a series of vis-near ir spectra of the P3-BTSNa and methyl P3-BTS respectively. taken with the cells charged to successively higher open circuit voltages. As in Example 14, the results were found to be typical of conducting polymers in that the π–π* transition was depleted with a concomitant shift of oscillator strength into two characteristic infrared bands. As in Example 14, the results of FIGS. 6 and 7 demonstrate both reversible charge storage and electrochromism.

Example 16

Polymerization and Analysis of Poly(Thiophene-3-(2-Ethanesulfonic Acid))

The polymeric sodium salt of thiophene-3-(2-ethanesulfonic acid) (Ht=S, $Y_1$=H, X=$SO_3$, M=H) was prepared as outlined above, dissolved in water and subjected to ion exchange chromatography on the acid form of a cation exchange resin. The results of atomic absorption analysis of the dark red-brown effluent indicated complete replacement of sodium by hydrogen. FIG. 8 shows the results of cyclic voltammetry carried out on films of the polymer ("P3-ETSH"/ITO glass working electrode, platinum counterelectrode, and a silver/silver chloride reference electrode in acetonitrile with fluoroboric acid-trifluoroacetic acid as electrolyte). The figure indicates that P3-ETSH is an electrochemically robust polymer when cycled between +0.1 and +1.2 V versus silver/silver chloride in a strongly acidic medium. There are two closely spaced oxidation waves, the first of which corresponds to a change in color from orange to green. The polymer could be cycled and corresponding color changes observed without noticeable change in stability at 100 mV/sec.

Electrochemical cells were constructed in glass to demonstrate electrochemical doping and charge storage via in situ optoelectrochemical spectroscopy, substantially as in the previous two Examples. The cells consisted of a film of the polymer on ITO glass (anode), platinum counterelectrode (cathode) and a silver/silver chloride reference electrode in acetonitrile with fluoroboric acid-trifluoroacetic acid as electrolyte.

FIG. 9 depicts a series of vis-near ir spectra of the P3-ETSH taken with the cell charged to a series, of successively higher open circuit voltages. In this case, the polymer was observed to spontaneously dope in the strongly acidic electrolyte solution. The results of FIG. 9 demonstrate both reversible charge storage and electrochromism. Control of the self-doping level for brief periods of time was achieved by imposing a voltage lower than the equilibrium circuit voltage.

Example 17

Preparation of Polymer Composite

Poly(thiophene-3-(2-ethanesulfonic acid)) (Formula I, Ht=S, $Y_1$=H, —$CH_2CH_2$—, X=$SO_3$, $N_1$=H, "P3-ETSH") as prepared in Example 4 was used to prepare a composite as follows. The compound was admixed with a solution of polyvinyl alcohol in water, and films of the neutral polymer were cast. Free standing deep orange films (indicating charge neutrality, as opposed to the blue-black zwitterionic polymers) cast from the prepared solution had excellent mechanical properties (soft, smooth and flexible) and could be chemically doped and undoped by compensation. This method of making conducting polymer composites is broadly applicable to the use of any water-soluble polymer in conjunction with P3-ETSH or P3-BTSH.

Example 18

Preparation of Polymer of 2,5-Diethoxycarbonyl-1, 4-Cyclohexanedione and p-Phenylenediamine To a suspension of 8.51 g (33.21 mmole) of 2,5-dicarboxyethyl-1,4-cyclohexanedione in 380 ml of freshly distilled butanol was added 3.59 g of p-phenylenediamine in 20 ml of butanol, followed by 40 ml of glacial acetic acid. The resulting mixture was heated to reflux for a period of 36 hrs, then it was exposed to oxygen by refluxing over a period of twelve hours, was hot filtered, the solid was washed with ether and extracted in a Soxhlet extractor with the following solvents: chloroform (6 days), chlorobenzene (5 days), and ether (4 days). This treatment afforded a dark solid (8.42 g). Elemental analysis calcd. for $C_{18}H_{18}N_2O_4$: C, 65.84; H, 6.14; N, 8.53. Found: C, 65.55; H, 6.21; N, 8.70. Ir (KBr, v cm-1): 3350w, 3240w, 2980m, 2900m, 1650s, 1600s, 1510s, 1440m, 1400w, 1220s, 1090w, 1065s, 820w, 770m, 600w, 495w.

Example 19

Polyaniline Dicarboxylic Acid

The above polymer diester is suspended in DMF and treated with a solution of 50% (w/w) sodium hydroxide. The reaction mixture is then heated to 100° C. for 48 hr under strictly anaerobic conditions to exclude oxygen. Upon cooling the mixture, it is poured into ice/HCl and filtered. The infrared spectrum of the product should show the following characteristic absorption peaks: 3100–2900br, 1600s, 1500s, 1210s.

We claim:

1. A method of making a self-doped zwitterionic conducting polymer having along its backbone a π-electron conjugated system, which method is selected from the following methods (A) or (B):

wherein method (A) which comprises:
(i) providing a polymer having along its backbone a π-electron conjugated system which comprises a plurality of recurring monomer units, between about 0.01 and 100 mole % of said units having the structure (I):

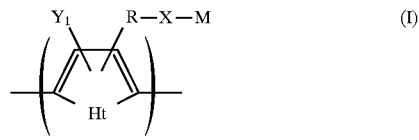

wherein Ht is a heterogroup selected from NH or S;
$Y_1$ is selected from the group consisting of hydrogen and —R—X—M, wherein
R is a linear or branched alkylene or alkylene ether having between 1 and about 10 carbon atoms;
X is a Bronsted acid anion selected from $CO_2$ or $SO_3$; and
M is a positive monovalent counterion except $H^+$; and
(ii) converting at least one —R—X—M group to a —R—X—H group by adding acid, thereby rendering said polymer self-doped, with the proviso that external dopant is not needed and is not present; or method (B) which comprises;
(a) providing at least one monomer having the structure:

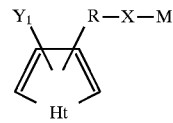

wherein Ht is a heterogroup selected from NH or S;
$Y_1$ is selected from the group consisting of hydrogen and —R—X—M, wherein
R is a linear or branched alkylene or alkylene ether having between 1 and about 10 carbon atoms;
—X—M is a Bronsted acid alkyl ester group, or X is a Bronsted acid anion selected from $CO_2$ or $SO_3$ and then M is a positive monovalent counterion, and
(b) polymerizing said monomers, and if M is not $H^+$, then
(c) converting at least one —R—X—M group to a R—X—H group by adding acid, thereby rendering said polymer self-doped, with the proviso that external dopant is not needed and is not present.

2. The method of claim 1, wherein the method (B) comprises the steps of:
providing an electrolyte solution comprising said monomer, immersing in said electrolyte solution, a working electrode and a counter electrode; and applying a voltage across said working electrode and said counter electrode, whereby polymerization of said monomer at said working electrode is effected to produce a polymer having along its backbone a π-electron conjugated system which comprises a plurality of recurring monomer units, between about 0.01 and 100 mole % of said units having the structure:

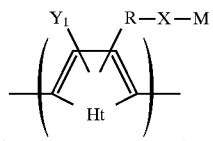 (I)

wherein Ht is a heterogroup selected from NH or S; $Y_1$ is selected from the group consisting of hydrogen and —R—X—M, wherein R is a linear or branched alkylene or alkylene ether having between 1 and about 10 carbon atoms; —X—M is a Bronsted acid or alkyl ester group, or X is a Bronsted acid anion selected from COO or $SO_3$ and then M is a positive monovalent counterion alkyl, and if M is not $H^+$, then further comprising the step of converting at least one —R—X—M group to a R—X—H group by adding acid, thereby rendering said polymer self-doped.

3. The method of claim 1 wherein R is linear alkylene.
4. The method of claim 1 wherein R is branched alkylene.
5. The method of claim 1 wherein:
M in method (A) is selected from the group consisting of $Li^+$, $Na^+$ and $K^+$; and
M in method (B) is selected from the group consisting of $H^+$, $Li^+$, $Na^+$, $K^+$, methyl and ethyl.
6. The method of claim 2 wherein R is branched alkylene ether.
7. The method of claim 2 wherein and R is linear alkylene ether.
8. The method of claim 2 wherein M in method (A) is selected from the group consisting of $Li^+$, $Na^+$ and $K^+$; and M in method (B) is selected from the group consisting of $H^+$, $Li^+$, $Na^+$, $K^+$, methyl and ethyl.
9. The method of claim 3 wherein R is branched alkylene ether.
10. The method of claim 9 wherein Ht is NH.
11. The method of claim 1 wherein Ht is S.
12. The method of claim 1 wherein X is $CO_2$.
13. The method of claim 10 wherein X is $SO_3$.
14. The method of claim 11 wherein X is $CO_2$.
15. The method of claim 9 wherein X is $SO_3$.
16. The method of claim 10 wherein X is $SO_3$.
17. The method of claim 11 wherein X is $SO_3$.
18. The method of claim 5 wherein M in method (A) is $Na^+$ or $K^+$.
19. The method of claim 5 wherein M in method (B) is $H^+$, $Na^+$ or $K^+$.
20. The method of claim 5 wherein M in method (A) is $Na^+$ or $K^+$, and Ht is S.
21. The method of claim 5 wherein M in method (B) is $H^+$, $Na^+$ or $K^+$, and t is NH or S.
22. The method of claim 1, wherein said monomer is selected from the group consisting of thiophene-3-acetic acid, methyl thiophene-3-(2-ethanesulfonate), and methyl thiophene-3-(4-butanesulfonate).

* * * * *